No. 778,153. PATENTED DEC. 20, 1904.
J. SULLIVAN.
TIRE.
APPLICATION FILED MAY 25, 1904.
NO MODEL. 2 SHEETS—SHEET 1.

Witnesses
Inventor
J. Sullivan
Attorneys

No. 778,153. PATENTED DEC. 20, 1904.
J. SULLIVAN.
TIRE.
APPLICATION FILED MAY 25, 1904.
NO MODEL. 2 SHEETS—SHEET 2.

Witnesses
Inventor
J. Sullivan.
Attorneys

No. 778,153.  
Patented December 20, 1904.

UNITED STATES PATENT OFFICE.

JERRY SULLIVAN, OF BUFFALO, NEW YORK.

TIRE.

SPECIFICATION forming part of Letters Patent No. 778,153, dated December 20, 1904.

Application filed May 25, 1904. Serial No. 209,772.

*To all whom it may concern:*

Be it known that I, JERRY SULLIVAN, a citizen of the United States, residing at Buffalo, in the county of Erie, State of New York, have invented certain new and useful Improvements in Tires; and I do hereby declare the following to be a full, clear, and exact description of the invention, such as will enable others skilled in the art to which it appertains to make and use the same.

This invention relates to vehicle-tires, and has for its object to provide a tire in which a maximum of resiliency will be obtained and which will be constructed in sections, so that it may be readily applicable to different-sized wheels.

A further object is to provide a tire of this nature the sections of which may be inflated and which will be so constructed that puncturing the tire will be prevented.

Figure 1:
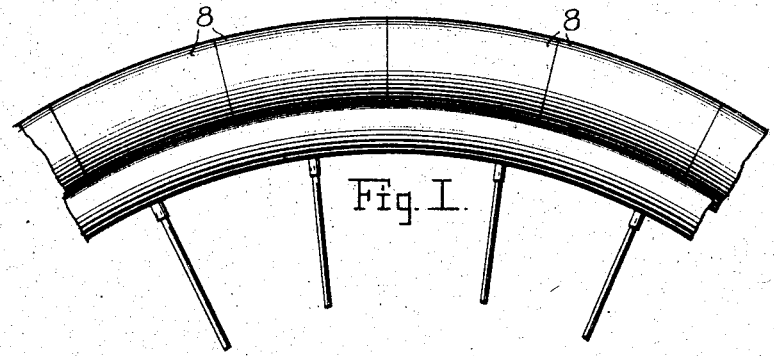
Figure 2:
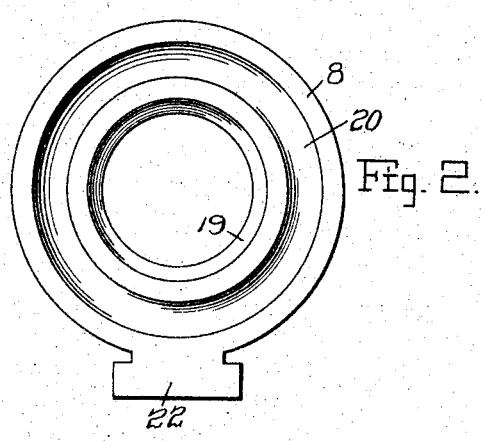
Figure 3:
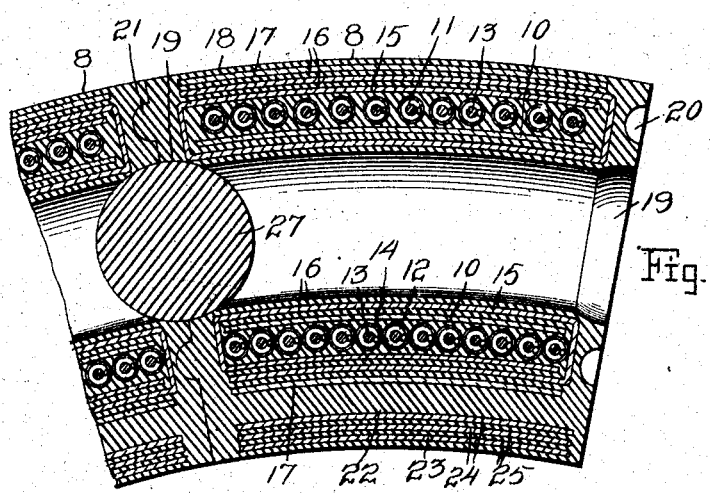
Figure 4:
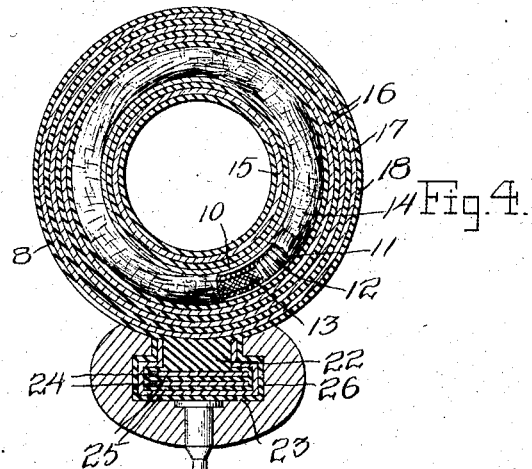
Figure 6:
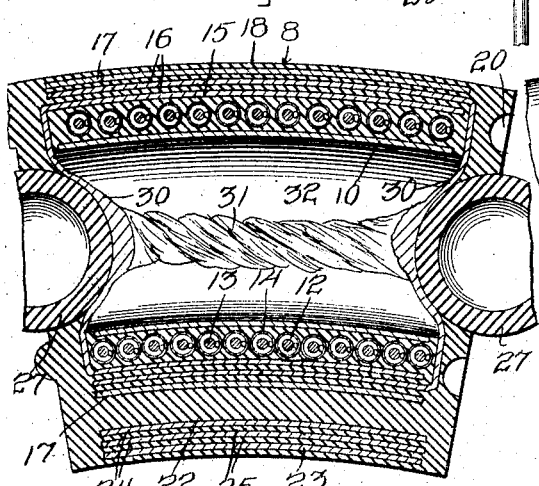
Figure 7:
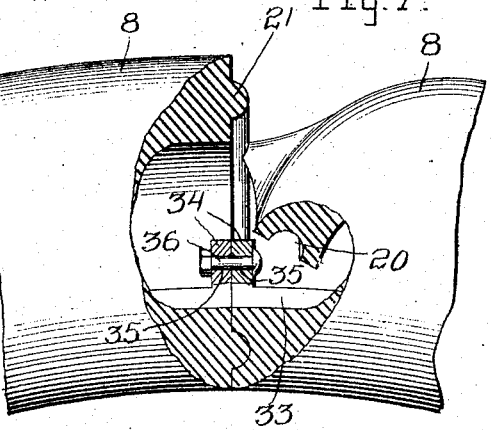
Figure 5:
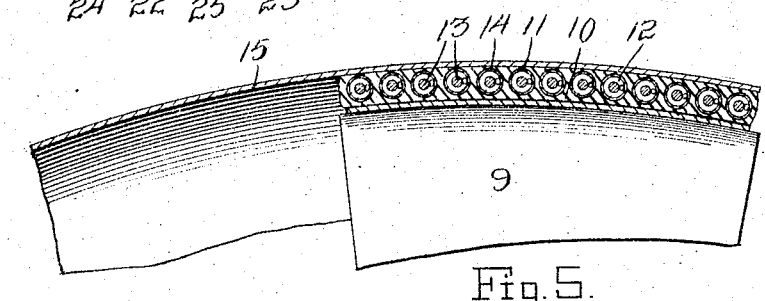

In the drawings forming a portion of this specification, in which like numerals of reference indicate similar parts in the several views, Figure 1 is a portion of a wheel provided with the present tire. Fig. 2 is an end view of one of the sections. Fig. 3 is a longitudinal section of one of the sections and showing its union with another section. Fig. 4 is a transverse section of one of the sections. Fig. 5 is a sectional view of a portion of a section in the process of construction. Fig. 6 is a longitudinal sectional view of a modification. Fig. 7 is a longitudinal section of a further modification shown during the operation of attaching the tire to the rim.

Referring now to the drawings, there is shown a tire comprising a plurality of sections 8, which are of peculiar construction. In forming the sections of the tire a cylindrical core 9 is provided, around which is wrapped a piece of fabric 10, the ends being lapped and cemented. The fabric is then coated with rubber solution, and a coil 11 is wrapped therearound.

The coil 11 consists of a helical spring 12, containing a core 13 of fabric, preferably a woven cord, and which is incased in a woven sheathing 14, which may be either a tubular fabric or a strip of fabric wound around the spring. Before the application of the sheathing to the spring the latter, together with the core 13, is soaked in rubber solution, and the sheathing is coated therewith after its application to the spring. This coating of the sheathing takes place just previous to the winding of the coil upon the fabric 10, so that the adhesiveness of the solution holds the helices of the coil one to another and to the fabric.

A piece of fabric 15 is provided which is somewhat more than three times longer than the coil 11, and this piece is disposed with one of its edges flush with one end of the coil, and the fabric 15 is then pressed down against the coil and has its free edges overlapped and cemented together. The fabric 15 now extends considerably beyond one end of the coil. After the fabric 15 has been thus disposed the core 9 is removed from within the fabric 10, the several portions of the section being held together by the hardened rubber solution. After the core has been removed the inner face of the fabric 10 is thoroughly coated with the solution and the fabric 15, which projects beyond the end of the coil, is turned over and is passed through the opening formerly occupied by the core 9 and is held to the inner face of the fabric 10 by the coating of solution. The portion of the fabric 15 which now projects out of the central opening of the section is turned backwardly over the outer face of the section and is held thereto by a coating of solution. It will be understood the several coatings of solution are applied with sufficient thickness to form thin layers of rubber 16 between the layers of fabric after the solution has become hardened.

From the above it will be seen that the coil 11 and the fabric 10 are completely inclosed by the fabric 15, so that any spreading of the coil longitudinally is prevented.

After the last-mentioned operation has been performed additional layers of fabric 17 and of rubber 18 are provided until the section has attained the desired proportions, after which it is placed in a mold and vulcanized. In the process of vulcanization the section is formed with the ends of its central opening flared outwardly, as shown at 19, and at one end the section is provided with a circular groove 20, surrounding the central opening, and at the other end with a circular rib 21, which is of a size to enter the groove 20 of a similarly-formed section. At its lower side the section is provided with a longitudinal T-shaped rib 22, having a binding-strip of fabric 23, which confines alternately layers 24 of fabric and 25 of rubber.

In applying the tire to a wheel the sections are disposed in the concavity of the rim with their ribs 22 engaged in a T-shaped slot 26 in the rim, the section lying each with its rib 21 in the groove 20 of the adjacent section, and in the flared ends 19 at the meeting ends of the sections are disposed rubber balls 27.

It will thus be seen that a tire is provided in which the natural collapsibility of the rubber and fabric is strengthened by the coil 11, which is yet sufficiently yieldable to impart a large amount of resiliency to the tire. The core 13 of the spring 12 prevents mashing of the latter under the weight of the vehicle, and, as mentioned above, the fabric 15 prevents spreading of the helices of the coil longitudinally of the section.

In Fig. 6 there is shown a construction in which the central openings of the sections are closed at their ends by rubber diaphragms 30 and which are provided with central cores 31, which connect the diaphragms. In forming a tire of this kind the operations are performed as in the first-described form until the removal of the core 9 from within the fabric 10. After this is done the fabric 15, which projects beyond the end of the coil, is turned over and passed through the opening without first coating the inner face of the fabric 10 with solution. Within the section the fabric 15 is twisted to form the core 31, and the portion of the fabric 15 which now projects out of the central opening of the section is turned backwardly over the outer face of the section and is held thereto by a coating of solution, so that the section is formed with an air-space 32 between the core 31 and the inner face of the fabric 10, the ends of this air-space 32 being closed by portions of the fabric 15. The air-spaces 32 permit of inflation of the sections to give resiliency to the tire, the coils 11 preventing puncturing thereof. In this form the balls 27 are shown hollow for inflation, and it will be understood that in the manufacture of the balls and sections they are inflated, and the openings through which the air is introduced are afterward closed.

In Fig. 7 there is shown a construction in which the sections are formed without the diaphragms and central core and in which the T-shaped rib is also omitted, and in this form the sections are secured to the rim of the wheel by means of a circular band 33, having angular ends 34, provided with alining perforations 35 for the reception of a tie-bolt 36, the band 33 being disposed within the sections and the ends thereof being drawn together by means of the tie-bolt. To reach the tie-bolt for operation thereof, two of the sections of the tire are forced apart and one of the sections is depressed, as shown in the drawings. It will of course be understood that in this form of the invention the balls 27 are omitted.

In practice modifications of the specific construction shown may be made and any suitable materials and proportions may be used for the various parts without departing from the spirit of the invention.

What is claimed is—

1. The combination with a wheel having a continuous T-shaped slot in its periphery, of a tire comprising a plurality of cylindrical sections having longitudinal T-shaped ribs engaged with the slot, each of said sections having recesses in its ends and having a groove at one end and a rib at the other, said groove and rib being concentric with the recesses, said sections being disposed each with its rib in the groove of the adjacent section, and a resilient ball disposed in the recesses of each pair of sections.

2. A tire comprising a plurality of sections, each including a tubular fabric, a resilient coil surrounding and cemented to the fabric, a second fabric inclosing the coil and the first fabric, the ends of the second fabric being overlapped and cemented together, and a coating of rubber for the fabric.

3. A tire comprising a plurality of sections, each section including a tubular fabric, a helical spring disposed about the tubular fabric in successive helices, a core of fabric within the spring, a sheathing of fabric disposed upon the spring and cemented to the tubular fabric, a second fabric secured at one end to the outer faces of the helices and passed through the tubular fabric, said second fabric having its free end secured to the outer face of its first-mentioned end, said fabric inclosing the tubular fabric and the spring, and a coating of rubber for the fabric.

4. The combination with a wheel, of a tire comprising a plurality of sections, each including a tubular fabric, a resilient coil surrounding and cemented to the fabric, a second fabric inclosing the coil and the first fabric, the ends of the first fabric being overlapped and cemented together, a coating of rubber for the fabric, said sections having sockets in their ends, and a resilient ball engaged in the sockets of the mutually-adjacent ends of each pair of sections.

In testimony whereof I affix my signature in presence of two witnesses.

JERRY SULLIVAN.

Witnesses:
   THEODORE B. SHELDON,
   LOUISE M. KELLER.